US006383329B1

(12) United States Patent
Agarwala et al.

(10) Patent No.: US 6,383,329 B1
(45) Date of Patent: May 7, 2002

(54) APPARATUS AND METHOD FOR REMOVING A LABEL FROM A SURFACE WITH A CHILLED MEDIUM

(75) Inventors: Rajiv S. Agarwala, Fairport; Cynthia A. Johnson, Macedon, both of NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/371,766

(22) Filed: Aug. 10, 1999

(51) Int. Cl.[7] .......... B32B 35/00

(52) U.S. Cl. .......... 156/344; 156/584; 134/7; 451/39

(58) Field of Search .......... 156/344, 584; 451/39; 134/6, 7

(56) References Cited

U.S. PATENT DOCUMENTS

| | | | | | |
|---|---|---|---|---|---|
| 4,191,201 | A | | 3/1980 | Barnsbee | 134/104 |
| 4,426,311 | A | | 1/1984 | Vander Mey | 252/143 |
| 5,009,240 | A | * | 4/1991 | Levi | 134/7 |
| 5,011,087 | A | * | 4/1991 | Richarson et al. | 241/5 |
| 5,062,898 | A | | 11/1991 | McDermott et al. | 134/7 |
| 5,203,794 | A | * | 4/1993 | Stratford et al. | 451/39 |
| 5,294,261 | A | | 3/1994 | McDermott et al. | 134/7 |
| 5,372,652 | A | | 12/1994 | Srikrishnan et al. | 134/7 |
| 5,390,450 | A | | 2/1995 | Goenka | 451/75 |
| 5,431,740 | A | | 7/1995 | Swain | 134/7 |
| 5,514,024 | A | | 5/1996 | Goenka | 451/39 |
| 5,616,067 | A | | 4/1997 | Goenka | 451/39 |
| 5,637,027 | A | * | 6/1997 | Palombo et al. | 134/7 X |
| 5,679,062 | A | | 10/1997 | Goenka | 451/75 |
| 5,766,368 | A | | 6/1998 | Bowers | 134/6 |
| 5,782,263 | A | | 7/1998 | Isaacson, Jr. et al. | 137/487.5 |
| 5,836,809 | A | | 11/1998 | Kosic | 451/89 |
| 5,853,128 | A | | 12/1998 | Bowen et al. | 239/329 |
| 5,944,581 | A | | 8/1999 | Goenka | 451/39 |
| 5,976,264 | A | | 11/1999 | McCullough et al. | 134/2 |
| 5,989,355 | A | * | 11/1999 | Brandt et al. | 134/6 |

FOREIGN PATENT DOCUMENTS

| | | | |
|---|---|---|---|
| EP | 044507 | * | 1/1982 |

* cited by examiner

*Primary Examiner*—Mark A. Osele
(74) *Attorney, Agent, or Firm*—Andrew D. Ryan

(57) ABSTRACT

An apparatus for removing labels from a housing is provided. The apparatus includes a tank for storing a medium at a pressure above ambient pressure. The apparatus also includes a medium conduit in communication with the tank for transporting the medium therefrom. The conduit defines a opening therein. The medium exiting the conduit at the opening is adapted to remove labels from the housing.

28 Claims, 6 Drawing Sheets

APPARATUS AND METHOD FOR REMOVING A LABEL FROM A SURFACE WITH A CHILLED MEDIUM

The present invention relates to a method and apparatus for a printing system. More specifically, the invention relates to a cleaning device for the manufacture of printing systems.

Cross reference is made to the following application filed concurrently herewith: U.S. application Ser. No. 09/371,765, abandoned, entitled "An Apparatus and Method for Cleaning a Soft Surface with a Chilled Medium" by Rajiv S. Agarwala et al.

The features of the present invention are useful in the printing arts and more particularly in electrophotographic printing. In the well-known process of electrophotographic printing, a charge retentive surface, typically known as a photoreceptor, is electrostatically charged, and then exposed to a light pattern of an original image to selectively discharge the surface in accordance therewith. The resulting pattern of charged and discharged areas on the photoreceptor form an electrostatic charge pattern, known as a latent image, conforming to the original image. The latent image is developed by contacting it with a finely divided electrostatically attractable powder known as "toner." Toner is held on the image areas by the electrostatic charge on the photoreceptor surface. Thus, a toner image is produced in conformity with a light image of the original being reproduced. The toner image may then be transferred to a substrate or support member (e.g., paper), and the image affixed thereto by fusing the toner image to the paper to form a permanent record of the image to be reproduced. Subsequent to development, excess toner left on the charge retentive surface is cleaned from the surface. The process is useful for light lens copying from an original or printing electronically generated or stored originals such as with a raster output scanner (ROS), where a charged surface may be imagewise discharged in a variety of ways.

Increasingly, machines and components are being recycled. The machines or components are removed from service and returned to the original manufacturer or to remanufacturing facilities where the machines are disassembled and components inspected. Components which may be reused into a newly remanufactured machine or component are then cleaned and repainted and any other processing step is performed on the component so that it may be reused.

One of the steps in reutilizing used components for remanufacturing is to clean those components. Often these used components are very difficult to clean. The difficulty in cleaning used components may be because the labels may be securely adhered to the components and be difficult to remove. Also the components may be made of a soft material, for example a plastic which may be easily damaged.

Often the components are cleaned through the use of a chemical process which may cause less damage to the surface of the soft material and be effective in removing the label and the adhesive used for the label from the component.

One such process is the use of LTS chemical solution. The mechanical component may be dipped in the solution for an extended period of time say from 4 to 6 hours. To remove the solution from the component, the component may be dipped in water. The label, if any on the component, must then be manually removed by scraping off the label with a blade. After the majority of the label has been removed manually by the blade, Lysol™ or a similar component, for example, XTC, is used to remove the remaining adhesive residue on the component. Once the adhesive has been removed from the component, the operation is complete and the component is sent to a parts washer for cleaning.

The process for cleaning soft components and for removing labels is very slow and time consuming. Also, chemicals may be required which require special handling which may require additional capital equipment and necessitate additional costs for the manufacturing process. Further, the use of blades and knives to physically remove the label is slow and time consuming. Further, the use of blades and knives may cause damage to the component surface.

Further, this process is slow and time consuming requiring many operators to perform this function in high capacity productive environments. Further, the chemical byproducts from this process must be safely handled and disposed.

The present invention is directed to alleviate at least some of the aforementioned problems.

The following disclosures may be relevant to various aspects of the present invention:

U.S. Pat. No. 5,853,128
Patentee: Bowen et al
Issue Date: Dec. 29, 1998

U.S. Pat. No. 5,782,263
Patentee: Isaacson, Jr. et al.
Issue Date: Jul. 21, 1998

U.S. Pat. No. 5,766,368
Patentee: Bowers
Issue Date: Jun. 16, 1998

U.S. Pat. No. 5,514,024
Patentee: Goenka
Issue Date: May 7, 1996

U.S. Pat. No. 5,431,740
Patentee: Swain
Issue Date: Jul. 11, 1995

U.S. Pat. No. 5,372,652
Patentee: Srikrishnan et al
Issue Date: Dec. 13, 1994

U.S. Pat. No. 5,294,261
Patentee: McDermott et al.
Issue Date: Mar. 15, 1994

U.S. Pat. No. 5,062,898
Patentee: McDermott et al.
Issue Date: Nov. 5, 1991

U.S. Pat. No. 4,426,311
Patentee: Vander Mey
Issue Date: Jan. 17, 1984

U.S. Pat. No. 4,191,201
Patentee: Barnsbee
Issue Date: Mar. 4, 1980

U.S. Pat. No. 5,853,128 discloses a method of removing photoresist or redeposited material from a substrate or other surface using a carbon dioxide jet spray. A substrate having photoresist or redeposited material on its surface is disposed in an environmental enclosure. A carbon dioxide jet spray is generated and directed onto the surface of the substrate and photoresist or redeposited material. The carbon dioxide jet spray cools or freezes the material and causes a mismatch in the thermal coefficient of expansion of the material and the substrate. The material debonds from the substrate due to the induced thermal shock to the material. This rapid shrinkage loosens the material and allows the solid particles in the spray to knock the material from the surface of the substrate. The removed photoresist or redeposited material may be collected in a filter, and removed.

U.S. Pat. No. 5,782,263 discloses a system is provided for removing material from a structure having at least one layer of the material formed on a substrate. The system includes a radiant energy source, such as a flashlamp, with an actively cooled reflector for irradiating a target area of a structure with radiant energy, preferably sufficiently intense in at least the visible and ultraviolet, to break or weaken chemical bonds in the material, and an abrasive blaster for impinging the material after irradiation with a cool particle stream, preferably including of CO2 particles, to remove the irradiated material and cool the substrate. The system may also include light sensors used in a feedback loop to control the removal process by varying the speed at which the radiant energy source is moved along the structure, the repetition rate of the source, the intensity of the source, the pulse width of the source and/or the distance between the source and the structure.

U.S. Pat. No. 5,766,368 discloses a method of cleaning an integrated circuit chip module prior to attaching wire bonds thereto. The method involves disposing a module containing an integrated circuit chip and IC bond pads without wire bonds in an environmental process enclosure. A carbon dioxide jet spray cleaning system having a spray nozzle and orifice assembly is disposed the environmental process enclosure. A jet spray of carbon dioxide is generated using the jet spray cleaning system. The carbon dioxide jet spray is directed onto the surface of the module such that the spray impacts the IC bond pads and module bond pads to clean unwanted adhesive from the surface of the module and thus clean the IC and module bond pads.

U.S. Pat. No. 5,514,024 discloses a CO2 nozzle which expels liquid CO2 under pressure through an orifice therein for converting the liquid into CO2 snow. The CO2 nozzle is contained within an elongated mixing cavity within a body which is coupled to an exhaust nozzle for directing the CO2 snow toward the workpiece. The CO2 nozzle includes several wings for creating aerodynamic turbulence within the elongated mixing cavity for enhancing the coagulation of the CO2 snow into larger CO2 snow particles or CO2 snowflakes.

U.S. Pat. No. 5,431,740 discloses an apparatus for cleaning cylindrical surfaces includes a plurality of cleaning stations. Each cleaning station is designed to receive a substrate and includes a plurality of nozzles. The inlet end of each nozzle is connected to a source of liquid Carbon Dioxide, and the outlet end of each nozzle is connected to one end of a respective Carbon Dioxide expansion chamber. Liquid Carbon dioxide leaving each nozzle is converted to solid Carbon Dioxide in the corresponding expansion chamber. The other end of each Carbon Dioxide expansion chamber is coupled to a respective funnel which is, in turn, connected to a dispersing saddle. The dispersing saddles disperse the stream of solid Carbon Dioxide particles leaving each funnel and direct these particles to the substrate surface. The dispersing saddles are placed such that the entire circumference of the substrate surface is enveloped within the various streams of solid Carbon Dioxide particles. In addition, the apparatus may include a source of a dry nonreactive gas which is introduced into each stream of solid Carbon Dioxide particles in order to reduce condensation on the surface from the surface of the substrate and to further direct each stream of solid Carbon Dioxide particles to the substrate surface.

U.S. Pat. No. 5,372,652 discloses an aerosol cleaning apparatus for cleaning a substrate includes an aerosol producing means having a nozzle head. The nozzle head is positioned at a selected proximity and orientation to the substrate which is held by a rotatable holder. The aerosol spray dislodges particles from the substrate and the rotation of the substrate further assists in the removal of the loosened particles. A method of aerosol cleaning includes rotating a substrate at a preselected speed and spraying an aerosol jet in conjunction with the rotation.

U.S. Pat. No. 5,209,028 discloses an apparatus for cleaning semi-conductor solid surfaces using a spray of frozen cryogen, such as argon, to impinge on the solid surface to remove contaminant particles. The apparatus includes an appropriate nozzle positioned in a housing designed for ultra clean conditions including sweep gas supply and evacuation conduits and a support table movably positioned within the housing to controllably convey the semi-conductor solid surface on a track under the spray of frozen cryogen emanating from the nozzle.

U.S. Pat. No. 5,062,898 discloses a method is disclosed for cleaning microelectronics surfaces using an aerosol of at least substantially solid argon particles which impinge upon the surface to be cleaned and then evaporate and the resulting gas is removed by venting along with the contaminants dislodged by the cleaning method.

U.S. Pat. No. 4,426,311 discloses Methylene chloride-methane sulfonic acid compositions used in removing polymeric organic substances from inorganic substrates, such as polymeric adhesives from metal and lens glass parts and positive and negative photoresists from metallized silicon/silicon dioxide wafers, which comprise an effective amount, usually about 1 to 40 percent by weight methane sulfonic acid and the balance methylene chloride are described. Methods for using the above composition at ambient temperatures to remove the polymeric organic substances from the metal and non-metallic inorganic substrates are also described.

U.S. Pat. No. 4,4,191,201 discloses plastic film cartridges generally comprise a variety of component parts plus a label affixed by adhesive to the cartridge housing. The cartridge housing (a plastic) is recyclable when the label and adhesive are removed and the housing is separated from the other non-compatible plastic and non-plastic cartridge components. In accordance with the invention, multi-stage reclaiming apparatus is disclosed wherein film cartridges are first rough chopped to provide physical separation of the cartridge components. The cartridge housing pieces are separated from other cartridge components on the basis of differences in specific gravity in a series of specific gravity separation tanks. To remove the labels and adhesive from the housing pieces, a separation tank contains a detergent solution capable of assisting in dissolving the adhesive. The tank is provided with a group of heating elements to cause the detergent solution to boil in the immediate vicinity thereof. As housing pieces travel past the heating elements they are rolled around, swirled and submerged and each housing piece with a label portion adhered thereto is exposed to the boiling detergent solution. The adhesive is thus dissolved and the label portions are driven off the housing pieces.

All the above references totally incorporated herein by reference.

In accordance with one aspect of the present invention, there is provided an apparatus for removing labels from a housing. The apparatus includes a tank for storing a medium at a pressure above ambient pressure. The apparatus also includes a medium conduit in communication with the tank for transporting the medium therefrom. The conduit defines a opening therein. The medium exiting the conduit at the opening is adapted to remove labels from the housing.

In accordance with another aspect of the present invention, there is provided an apparatus for cleaning a housing. The apparatus includes a tank for storing a carbon dioxide at a pressure higher than ambient pressure and a medium conduit. The medium conduit is in communication with the tank for transporting the medium therefrom. The medium conduit defines a opening therein. The medium exiting the conduit at the opening being is in at least partially a solid form and is adapted to remove labels from the housing. The medium conduit is adapted to transform the compressed fluid medium from a liquid to a solid. At least one of the medium conduit and said tank are adapted to provide the medium in the form of pellets. The apparatus further includes at least one of an enclosure for containing debris from the cleaning of the housing and for containing the medium and a nozzle extending from the conduit at the opening thereof. The apparatus also includes an air conduit for transporting compressed air from a compressed air source and a venturi operably associated with the conduit and with the medium conduit for mixing compressed air with the medium.

In accordance with yet another aspect of the present invention, there is provided a method for removing labels from a housing. The method includes the steps of supplying a medium at a pressure higher than ambient pressure, transporting the medium through a conduit, transforming the medium at least partially to a solid, and adapting the medium to remove labels from the housing.

BRIEF DESCRIPTION OF THE DRAWINGS

The invention will be described in detail herein with reference to the following figures in which like reference numerals denote like elements and wherein.

Figure 1:
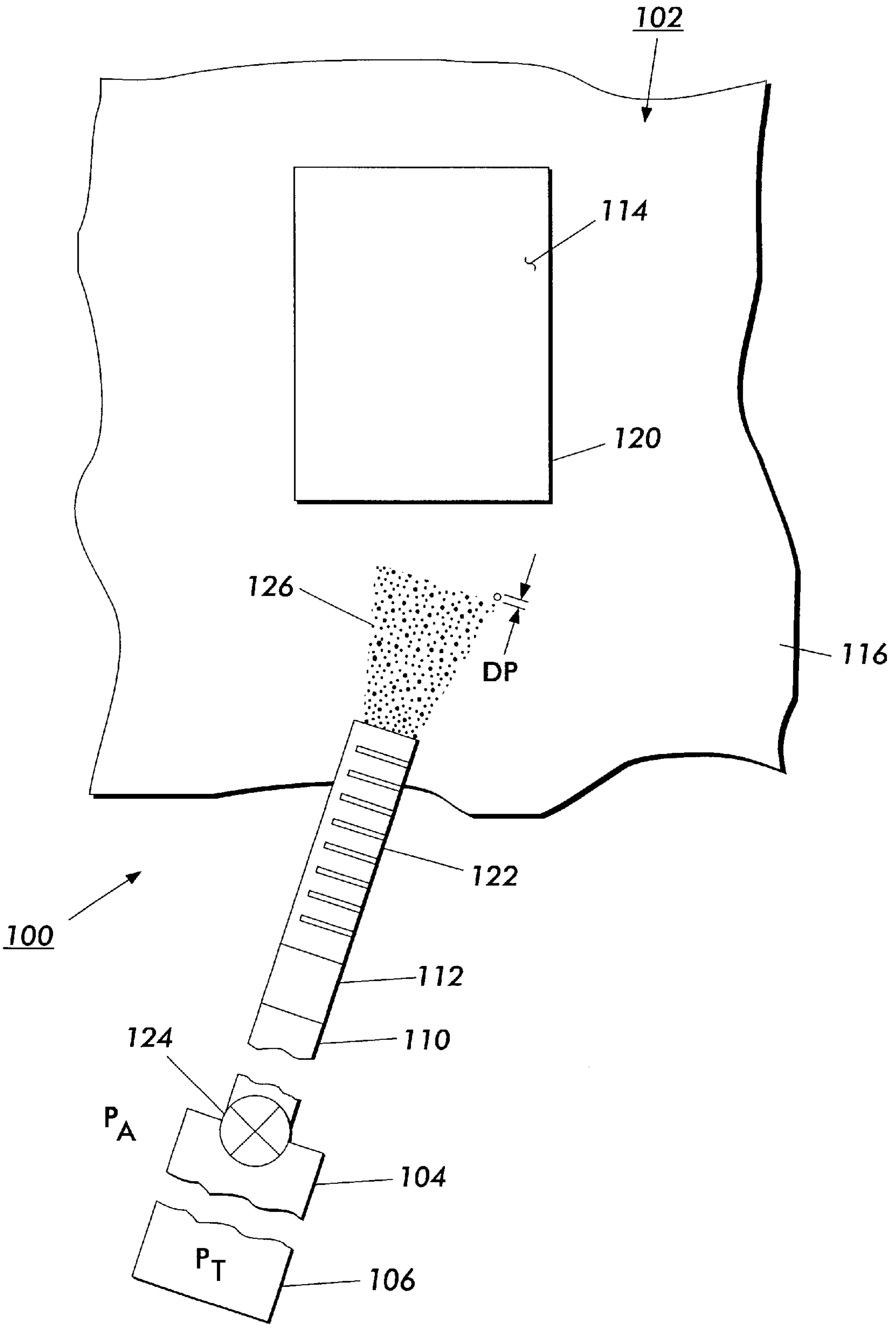
FIG. 1 is an perspective view of a label being removed by a chilled medium cleaning apparatus according to the present invention.

While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

For a general understanding of the features of the present invention, reference is made to the drawings. In the drawings, like reference numerals have been used throughout to identify identical elements.

Figure 2:
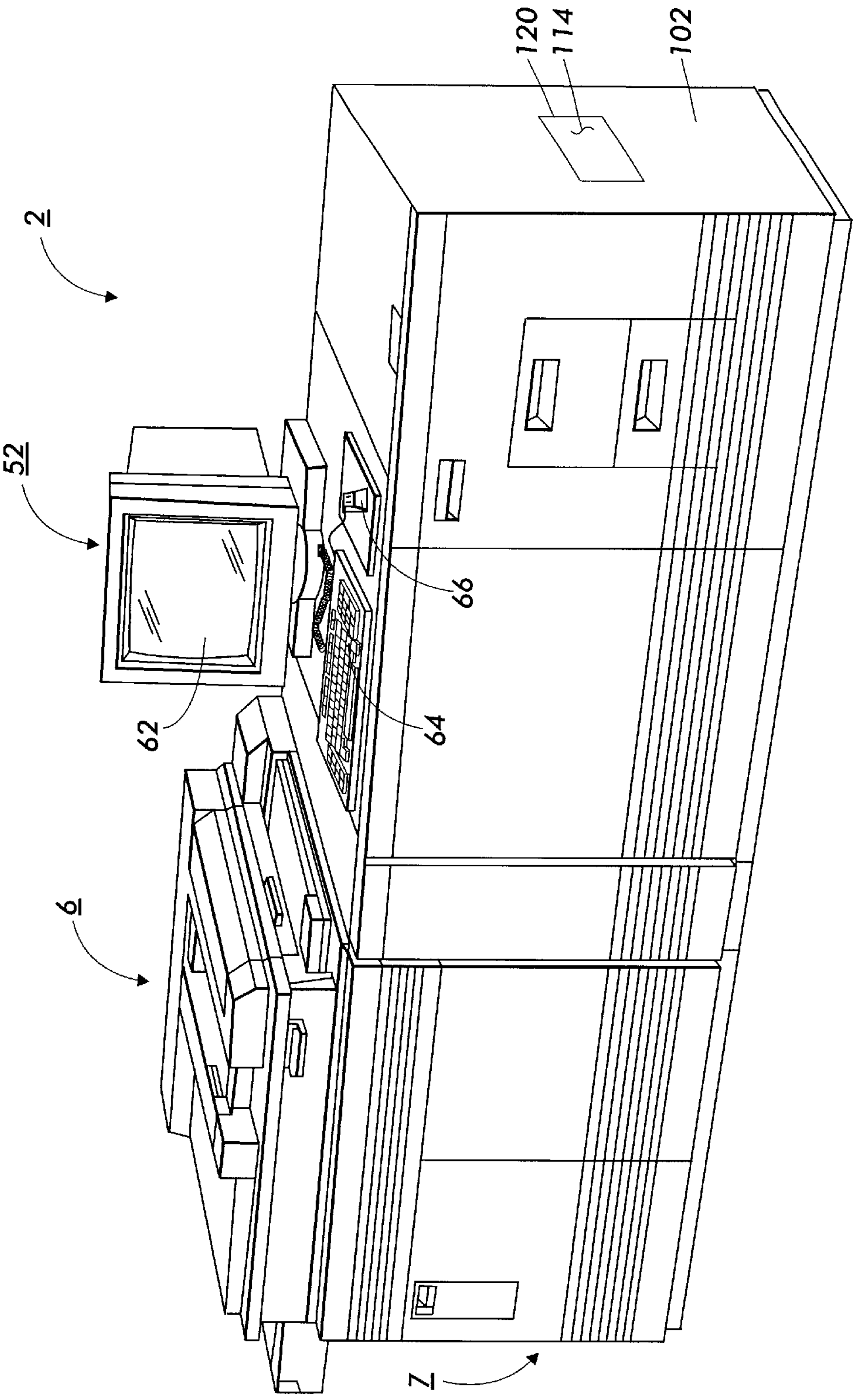
FIG. 2 is a perspective view of an illustrative electrophotographic printing machine incorporating the label which may be removed with the chilled medium cleaning apparatus of the present invention.

Referring first to FIG. 2 is an illustrative electrophotographic printing machine 2 incorporating the flow coated fuser roll of the present invention therein is shown. The machine includes an input device 6 such as a raster input scanner (RIS). An operator interface may be in the form of a cathode ray tube (CRT) including screen 62 for displaying the user interface commands. A keyboard 64 and a mouse 66 may be provided to provide for user interface with the machine 2. Machine controls 7 are housed in the machine to control its operation.

Figure 3:
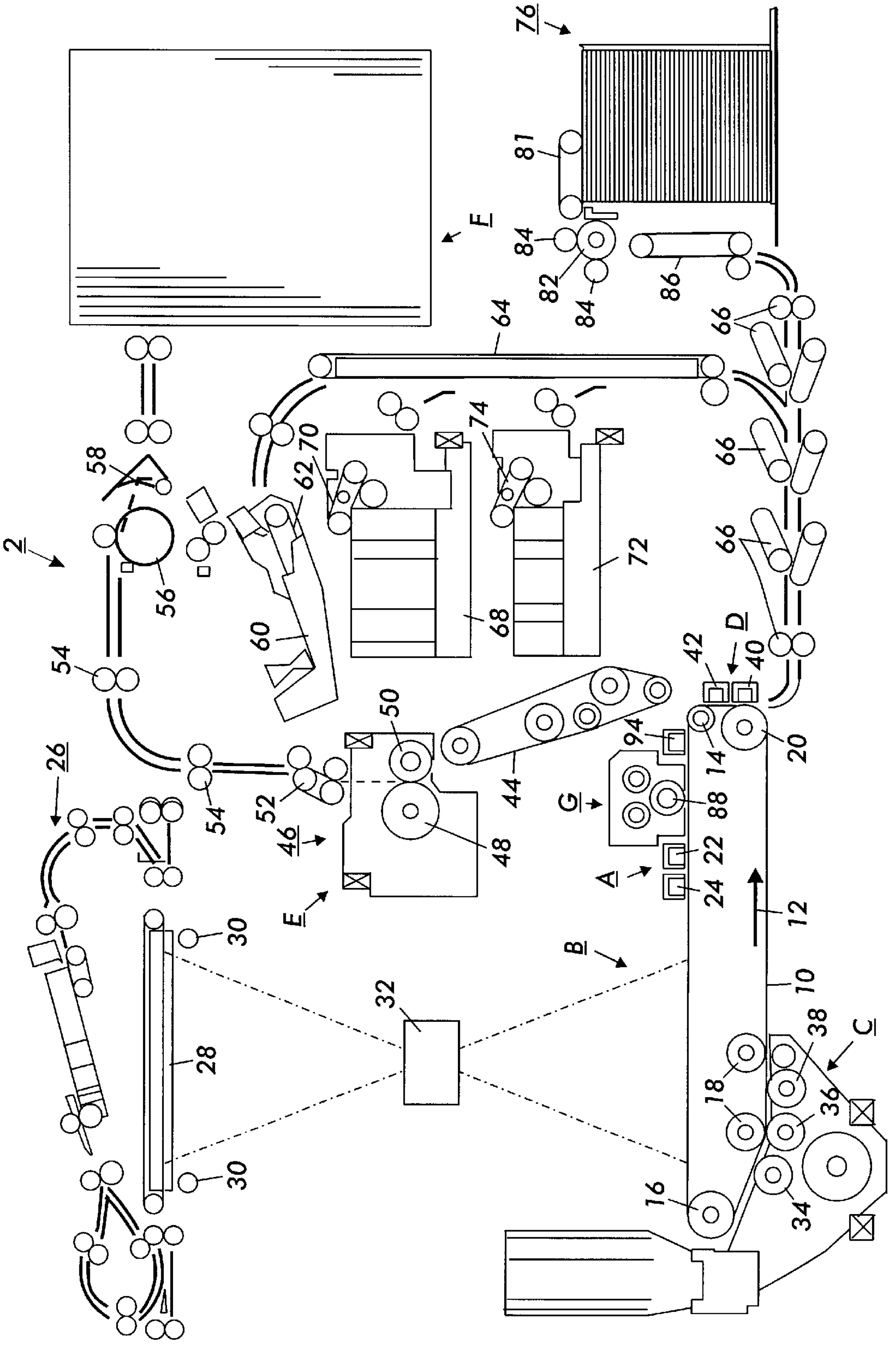
FIG. 3 is a schematic elevational view of the printing machine of FIG. 2.

Referring now to FIG. 3 an electrophotographic printing machine incorporating the features of the present invention therein are schematically depicted. It will become evident from the following discussion that the set transfer device of the present invention may be employed in a wide variety of machines and is not specifically limited in its application to the particular embodiment depicted herein.

Referring to FIG. 3 of the drawings, the electrophotographic printing machine employs a photoconductive belt 10. Preferably, the photoconductive belt 10 is made from a photoconductive material coated on a ground layer, which, in turn, is coated on an anti-curl backing layer. The photoconductive material is made from a transport layer coated on a selenium generator layer. The transport layer transports positive charges from the generator layer. The generator layer is coated on an interface layer. The interface layer is coated on the ground layer made from a titanium coated Mylar™. The interface layer aids in the transfer of electrons to the ground layer. The ground layer is very thin and allows light to pass therethrough. Other suitable photoconductive materials, ground layers, and anti-curl backing layers may also be employed. Belt 10 moves in the direction of arrow 12 to advance successive portions sequentially through the various processing stations disposed about the path of movement thereof. Belt 10 is entrained about stripping roller 14, tensioning roller 16, idler roll 18 and drive roller 20. Stripping roller 14 and idler roller 18 are mounted rotatably so as to rotate with belt 10. Tensioning roller 16 is resiliently urged against belt 10 to maintain belt 10 under the desired tension. Drive roller 20 is rotated by a motor coupled thereto by suitable means such as a belt drive. As roller 20 rotates, it advances belt 10 in the direction of arrow 12.

Initially, a portion of the photoconductive surface passes through charging station A. At charging station A, two corona generating devices indicated generally by the reference numerals 22 and 24 charge the photoconductive belt 10 to a relatively high, substantially uniform potential. Corona generating device 22 places all of the required charge on photoconductive belt 10. Corona generating device 24 acts as a leveling device, and fills in any areas missed by corona generating device 22.

Next, the charged portion of the photoconductive surface is advanced through imaging station B. At imaging station B, a document handling unit indicated generally by the reference numeral 26 is positioned over platen 28 of the printing machine. Document handling unit 26 sequentially feeds documents from a stack of documents placed by the operator faceup in a normal forward collated order in the document stacking and holding tray. A document feeder located below the tray, forwards the bottom document in the stack to a pair of take-away rollers. The bottom sheet is then fed by the rollers through a document guide to a feed roll pair and belt. The belt advances the document to platen 28. After imaging, the original document is fed from platen 28 by the belt into a guide and feed roll pair. The document then advances into an inverter mechanism and back to the document stack through the feed roll pair. A position gate is provided to divert the document to the inverter or to the feed roll pair. Imaging of the document is achieved by lamps 30 which illuminate the document on a platen 28. Light rays reflected from the document are transmitted through the lens 32. Lens 32 focuses light images of the document onto the charged portion of the photoconductive belt 10 to selectively dissipate the charge thereon. This records an electrostatic latent image on the photoconductive belt which corresponds to the informational areas contained within the original document.

Obviously, electronic imaging of page image information could be facilitated by a printing apparatus utilizing electrical imaging signals. The printing apparatus can be a digital copier including an input device such as a raster input scanner (RIS) and a printer output device such as a raster output scanner (ROS), or, a printer utilizing a printer output device such as a ROS. Other types of imaging systems may also be used employing, for example, a pivoting or shiftable LED write bar or projection LCD (liquid crystal display) or other electro-optic display as the "write" source.

Thereafter, belt 10 advances the electrostatic latent image recorded thereon to development station C. Development station C has three magnetic brush developer rolls indicated generally by the reference numerals 34, 36 and 38. A paddle wheel picks up developer material and delivers it to the developer rolls. When the developer material reaches rolls 34 and 36, it is magnetically split between the rolls with half of the developer material being delivered to each roll. Photoconductive belt 10 is partially wrapped about rolls 34 and 36 to form extended development zones. Developer roll 38 is a clean-up roll. A magnetic roll, positioned after developer roll 38, in the direction of arrow 12 is a carrier granule removal device adapted to remove any carrier granules adhering to belt 10. Thus, rolls 34 and 36 advance developer material into contact with the electrostatic latent image. The latent image attracts toner particles from the carrier granules of the developer material to form a toner powder image on the photoconductive surface of belt 10. Belt 10 then advances the toner powder image to transfer station D.

At transfer station D, a copy sheet is moved into contact with the toner powder image. First, photoconductive belt 10 is exposed to a pre-transfer light from a lamp (not shown) to reduce the attraction between photoconductive belt 10 and the toner powder image. Next, a corona generating device 40 charges the copy sheet to the proper magnitude and polarity so that the copy sheet is tacked to photoconductive belt 10 and the toner powder image attracted from the photoconductive belt to the copy sheet. After transfer, corona generator 42 charges the copy sheet to the opposite polarity to detack the copy sheet from belt 10. Conveyor 44 advances the copy sheet to fusing station E.

Fusing station E includes a fuser assembly indicated generally by the reference numeral 46 which permanently affixes the transferred toner powder image to the copy sheet. Preferably, fuser assembly 46 includes a heated fuser roller 48 and a pressure roller 50 with the powder image on the copy sheet contacting fuser roller 48. The pressure roller is cammed against the fuser roller to provide the necessary pressure to fix the toner powder image to the copy sheet. The fuser roll is internally heated by a quartz lamp. Release agent, stored in a reservoir, is pumped to a metering roll. A trim blade trims off the excess release agent. The release agent transfers to a donor roll and then to the fuser roll.

After fusing, the copy sheets are fed through a decurler 52. Decurler 52 bends the copy sheet in one direction to put a known curl in the copy sheet and then bends it in the opposite direction to remove that curl.

Forwarding rollers 54 then advance the sheet to duplex turn roll 56. Duplex solenoid gate 58 guides the sheet to the finishing station F, or to duplex tray 60. At finishing station F, copy sheets are stacked in a compiler tray and attached to one another to form sets. The sheets can be attached to one another by either a binder or a stapler. In either case, a plurality of sets of documents are formed in finishing station F. When duplex solenoid gate 58 diverts the sheet into duplex tray 60. Duplex tray 60 provides an intermediate or buffer storage for those sheets that have been printed on one side and on which an image will be subsequently printed on the second, opposite side thereof, i.e., the sheets being duplexed. The sheets are stacked in duplex tray 60 facedown on top of one another in the order in is which they are copied.

In order to complete duplex copying, the simplex sheets in tray 60 are fed, in seriatim, by bottom feeder 62 from tray 60 back to transfer station D via conveyor 64 and rollers 66 for transfer of the toner powder image to the opposed sides of the copy sheets. Inasmuch as successive bottom sheets are fed from duplex tray 60, the proper or clean side of the copy sheet is positioned in contact with belt 10 at transfer station D so that the toner powder image is transferred thereto. The duplex sheet is then fed through the same path as the simplex sheet to be advanced to finishing station F.

Copy sheets are fed to transfer station D from secondary tray 68. The secondary tray 68 includes an elevator driven by a bi-directional AC motor. Its controller has the ability to drive the tray up or down. When the tray is in the down position, stacks of copy sheets are loaded thereon or unloaded therefrom. In the up position, successive copy sheets may be fed therefrom by sheet feeder 70. Sheet feeder 70 is a friction retard feeder utilizing a feed belt and take-away rolls to advance successive copy sheets to transport 64 which advances the sheets to rolls 66 and then to transfer station D.

Copy sheets may also be fed to transfer station D from auxiliary tray 72. The auxiliary tray 72 includes an elevator driven by a directional AC motor. Its controller has the ability to drive the tray up or down. When the tray is in the down position, stacks of copy sheets are loaded thereon or unloaded therefrom. In the up position, successive copy sheets may be fed therefrom by sheet feeder 74. Sheet feeder 74 is a friction retard feeder utilizing a feed belt and take-away rolls to advance successive copy sheets to transport 64 which advances the sheets to rolls 66 and then to transfer station D.

Secondary tray 68 and auxiliary tray 72 are secondary sources of copy sheets. The high capacity sheet feeder, indicated generally by the reference numeral 76, is the primary source of copy sheets. Feed belt 81 feeds successive uppermost sheets from the stack to a take-away drive roll 82 and idler rolls 84. The drive roll and idler rolls guide the sheet onto transport 86. Transport 86 advances the sheet to rolls 66 which, in turn, move the sheet to transfer station D.

Invariably, after the copy sheet is separated from the photoconductive belt 10, some residual particles remain adhering thereto. After transfer, photoconductive belt 10 passes beneath corona generating device 94 which charges the residual toner particles to the proper polarity. Thereafter, the pre-charge erase lamp (not shown), located inside photoconductive belt 10, discharges the photoconductive belt in preparation for the next charging cycle. Residual particles are removed from the photoconductive surface at cleaning station G. Cleaning station G includes an electrically biased cleaner brush 88 and two de-toning rolls. The reclaim roll is electrically biased negatively relative to the cleaner roll so as to remove toner particles therefrom. The waste roll is electrically biased positively relative to the reclaim roll so as to remove paper debris and wrong sign toner particles. The toner particles on the reclaim roll are scraped off and deposited in a reclaim auger (not shown), where it is transported out of the rear of cleaning station G.

It is believed that the foregoing description is sufficient for purposes of the present application to illustrate the general operation of an electrophotographic printing machine incorporating a polymeric printing roll manufactured from the flowcoat process utilizing the loop type blade of the present invention therein.

According to the present invention and referring now to FIG. 1, an apparatus 100 for cleaning a housing 102 is shown. The apparatus 100 includes a tank 104 for storing a medium 106 at a pressure PT which is higher than ambient pressure PA. The apparatus 100 further includes a medium conduit 110. The medium conduit 110 is in communication with the tank 104 and is utilized for transporting the medium 106 from the tank 104. The medium conduit 110 defines an opening 112 in the conduit 110. Further, the medium 106 exiting the medium conduit 110 at the opening 112 is adapted to remove labels 114 from the housing 102.

The housing 102 may be any mechanical component for which cleaning is required. For example, the housing 102 may include a surface or panel 116 to which the label 114 is secured. The soft material for which a portion of the housing 102 is made may, for example, have a Brinell hardness number, for example, 100 Brinell or less. The soft material may, for example, be a plastic. For example, polyethylenes and polypropylenes are often used for panels and similar housing configurations.

The label 114 may be secured to the housing 102 in any suitable fashion but typically is secured to the housing 102 by means of an adhesive 120. Preferably and as shown in FIG. 1, the apparatus 100 further includes a nozzle 122 extending from the medium conduit 110.

The medium 106 may be any material capable of cleaning the housing 102. Preferably and as shown in FIG. 1, the medium 106 is at least partially and solid form as it impacts the housing 102. The solid form of the medium 106 serves to better clean and scrub the housing 102. Further, the striking of the medium 106 in a solid form against the housing 102 serves to remove more heat from the housing 102 as well as from the adhesive 120 to more quickly cool the adhesive 120. Preferably and as shown in FIG. 1, the medium 106 is in the form of carbon dioxide. Carbon dioxide is particularly effective medium for the apparatus 100 of the present invention. Carbon dioxide may be stored under pressure at room temperature in a storage tank for use in a manufacturing facility. When the liquid carbon dioxide is permitted to escape the tank 104 through, for example, tank valve 124 and be transformed into a solid or pelletized form.

As the liquid CO2 medium 106 escapes through tank valve 124 to the medium conduit 110, it forms generally spherical solid particles or pellets. Commercially available pelletizing machines are available to convert compressed liquid CO2 into frozen solid pellets. Preferable and as shown in FIG. 1, the pellets 126 preferably have a diameter DP of, for example, 0.040 inches or less. The small pellet size permits the use of this process on housing 102 made of soft material such as plastic. The smaller pellet size does not wear or damage the plastic housing.

Preferably and as shown in FIG. 1, the pellets 126 which exit the nozzle 122 are adapted to remove the labels 114 from the housing 102. Preferably the pellets 126 are adapted to freeze the adhesive 120 securing the label 114 to the housing 102. When the adhesive 120 is frozen or reaches its glass transition temperature, the adhesive 120 may be easily removed by the pellets 126 and the label 114 and the adhesive 120 separates quickly from the housing 102. For an adhesive 120 of the glass transition temperature is approximately minus 110 degrees Fahrenheit.

Figure 6:
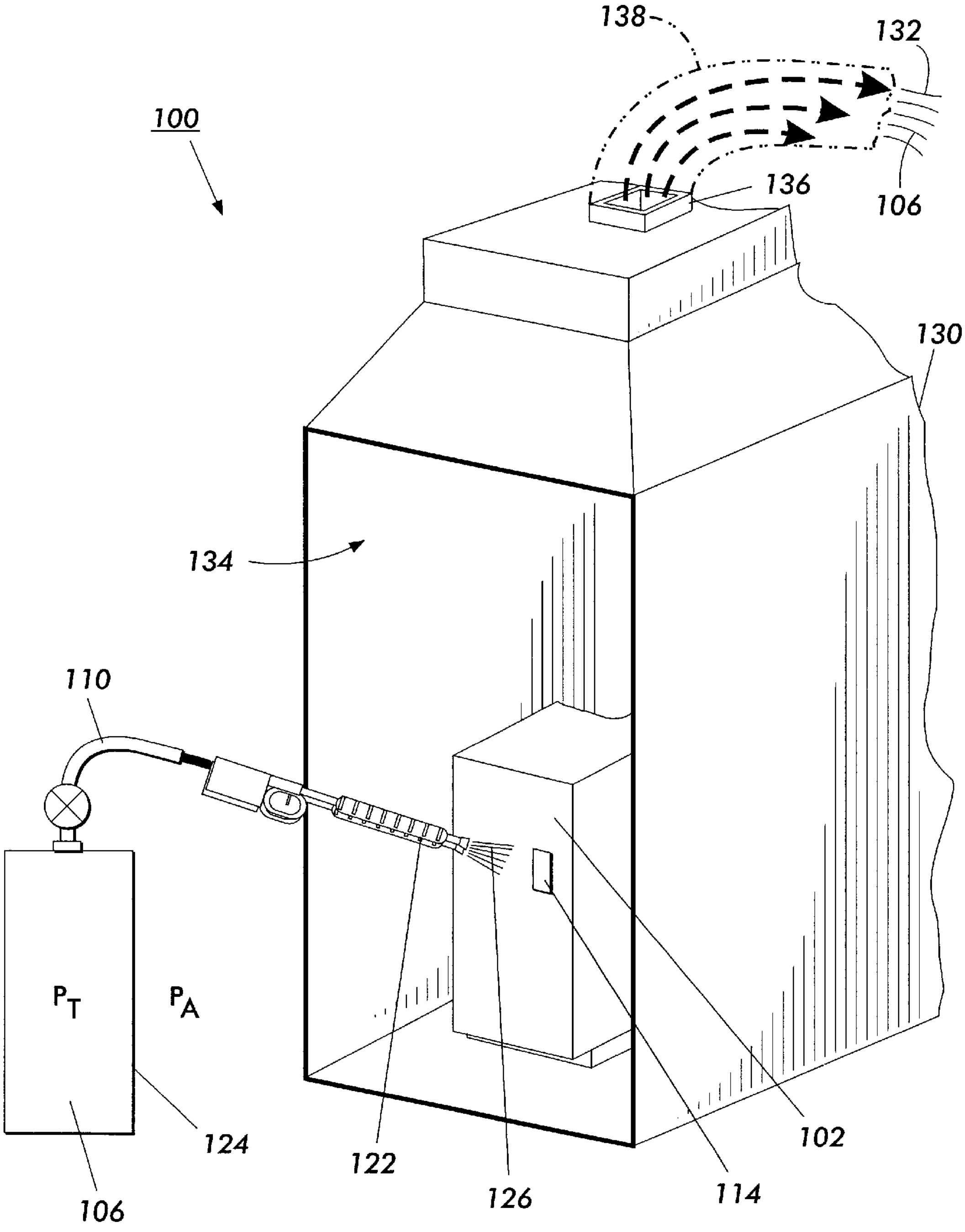
FIG. 6 is a perspective view of a cleaning booth for use with the FIG. 4 chilled medium cleaning apparatus.

Referring now to FIG. 6, the apparatus 100 is shown in greater detail. As shown in FIG. 6, the apparatus 100 may further include an enclosure 130 for containing debris 132 from the cleaning of the housing 102 and for containing the medium 106. The enclosure 130 may have any suitable shape capable of containing the housing 102 and at least a portion of the nozzle 122.

As shown in FIG. 6 in manual operation, the enclosure 130 may include an open side 134 through which the nozzle 122 may be directed to clean the housing 102 within the enclosure 130. Since the medium 106 is preferably in the form of carbon dioxide as the carbon dioxide pellets 126 sublimate within the enclosure 130, the medium 106 in the form of a gas escapes through vent 136 positioned on the top of the enclosure 130. By placing a negative pressure within the duct 138 attached to the vent 136, debris 132 may likewise escape through the vent 136.

Figure 5:
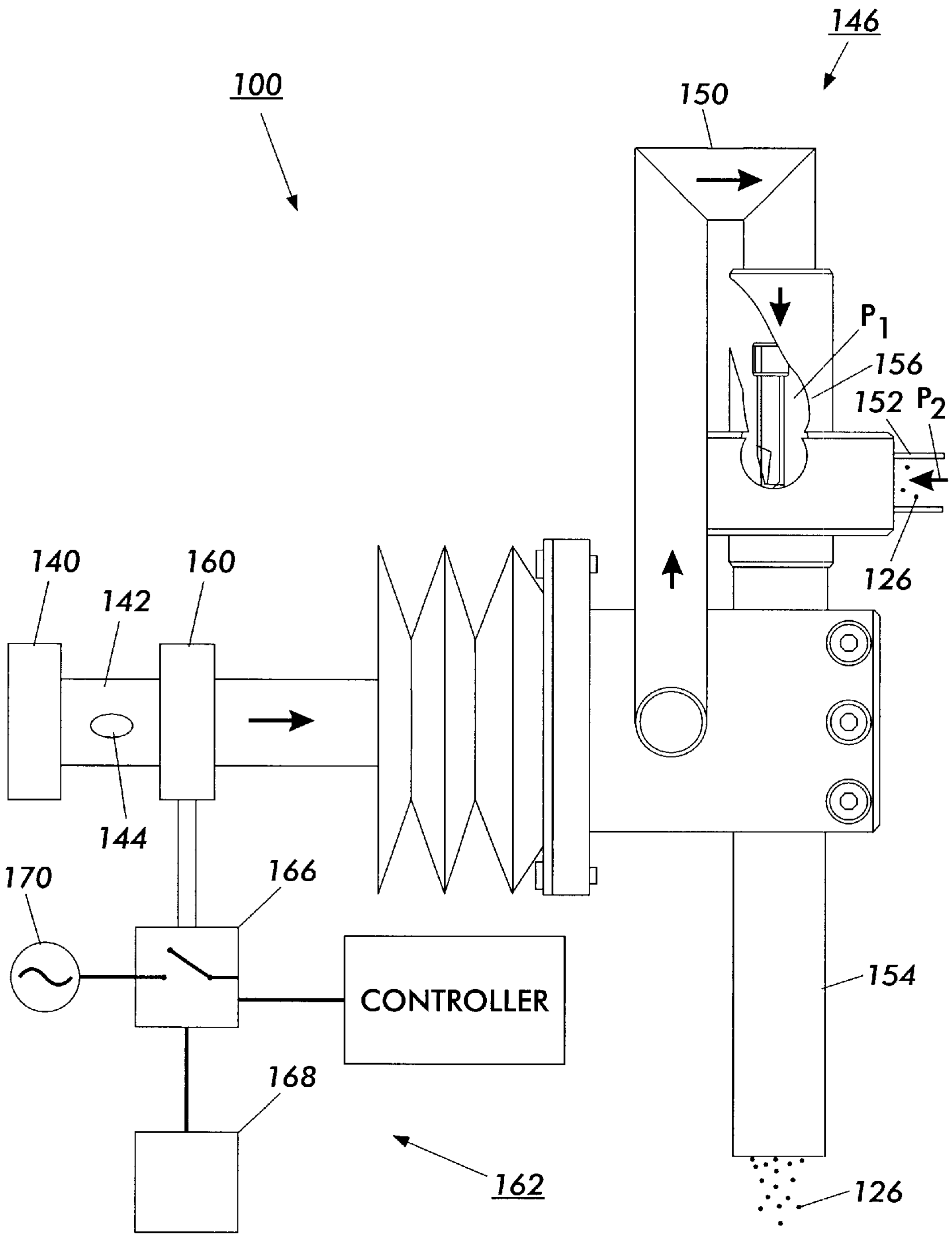
FIG. 5 is an elevational view a mixing nozzle for use with the FIG. 4 chilled medium cleaning apparatus.

Referring now to FIG. 5, the apparatus 100 preferably utilizes a compressed air source 140 for propelling the pellets 126 through the apparatus 100. The apparatus 100 may thus further include a air conduit in the form of, for example, an inlet air conduit 142 for transporting compressed air 144 from the compressed air source 140. The apparatus 100 may further include a device 146 in the form of, for example, a valve for mixing compressed air 144 with the pellets 126. The compressed air source 140 may be any compressed air source, for example, in the form of a commercially available electric or gas powered compressor. The compressed air source 140 preferably provides compressed air with a pressure of, for example, approximately 70 pounds per square inch.

The valve 146 may be any device capable of mixing the pellets 126 with the air 144. For example, the valve 146 may include an outlet air conduit 150 and an inlet media conduit 152. The outlet air conduit 150 and the inlet media 152 respectively permit the air 144 and the pellets 126 to enter the valve 146 and an outlet member conduit 154 expels a mixture of pellets 126 and air 144. The applicants have found that if the valve 146 includes a peripheral opening 154 which serves as a venturi, the pressure differential between an internal cavity 156 of the valve 146 and the inlet media conduit 152 is approximately 15 pounds per square inch. The 15 pounds per square inch of negative pressure between the cavity 156 and the conduit 152 tends to draw or suck the pellets 126 quickly into the valve 146 preventing the pellets 126 to coagulate within the conduit 152 forming collections of pellets which form conglomerations which act as snowballs and clog the conduit 152.

In other words, the pressure P1 within the cavity 154 is approximately 15 pounds per square inch less than the pressure P2 within the inlet media conduit 152.

The inlet media conduit 152 and the outlet media conduit 154 are exposed to the pellets 126 which have an extremely low temperature of, for example, minus 110° Fahrenheit. The extremely cold temperature of the pellets 126 causes the inlet media conduit 152 and the outlet media conduit 154 to become very cold and brittle.

The necessity to direct the spray of pellets 126 from the nozzle 122 onto the housing 102 (see FIG. 1) necessitates that the conduits 152 and 154 be flexed or moved about quickly and repeatedly. The conduits 152 and 154 thus tend to become very cold and brittle and as they are moved about, the conduits 152 and 154 freeze up and become brittle. Any bend of the conduits 152 and 154 when they freeze up and become brittle would cause the conduits 152 and 154 to break. The material utilized for the conduits 152 and 154 is preferably carefully chosen to withstand extremely low temperatures. One such material for the conduits 152 and 154 is a hose made of silicon with string lining. Even with utilizing such a low temperature tough material, the applicants found that the conduits 152 and 154 when subjected to a constant cold temperature of, for example, minus 110° degrees Fahrenheit would very quickly become brittle and inoperative.

The applicants have found that preferably the apparatus 100 includes a heating device or heater 160 to heat the conduits 152 and 154 so that they may again become pliable. While it should be appreciated that the heater 160 may be place any where in order to warm the conduits 152 and 154 as shown in FIG. 5, the heater 160 is placed within the air conduit between the inlet air conduit 142 and the outlet air conduit 150.

The applicants have found that for every 15 minutes of operation of the apparatus 100, the supply of pellets 126 from the inlet media conduit may be suspended and the heater 160 may be energized to blow 140° degrees Fahrenheit air at 90 PSI for 15 seconds through the inlet air conduit and outlet air conduit 150. Placing the 140° air through the outlet air conduit 150 for only 15 seconds revives the elasticity of the outlet member conduit 154 such that the hose may continue to function for another 15 minutes until this process must be repeated. Preferably, thus, the heater 160 includes a system 162 for permitting the heater 160 to operate intermittently. For example, the system 162 may include controller which controls the operation of a switch 166 which, based upon a timer 168, permits power from a power source 170 to energize the heater 160 when the media conduit 154 is to be heated.

The applicants have found that the heater 160 may be a blast air heater commercially available from, for example, Alpheus.

Figure 4:
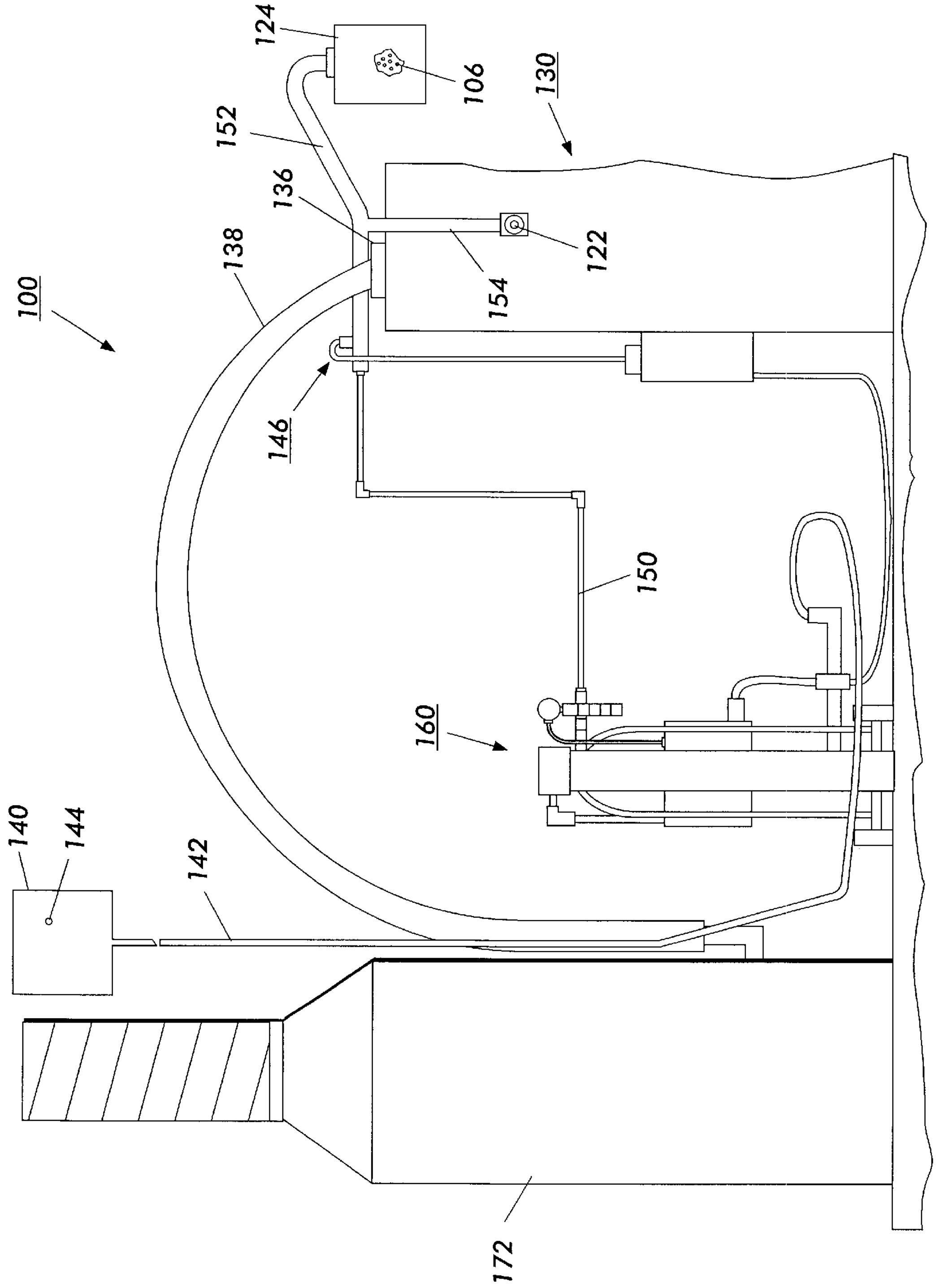
FIG. 4 is an elevational view of a chilled medium cleaning apparatus according to the present invention of the present invention.

Referring now to FIG. 4, the valve 146 of FIG. 5 is shown installed in the apparatus 100. The medium 106 from the tank 124 passes through the medium inlet conduit 152 to the valve 146. Compressed air 144 from the compressed air source 140 passes through air inlet conduit 142 to the air blast heater 160 which intermittently warms the air 144 as it passes to the outlet air conduit 150. Air 144 from the outlet air conduit 150 mixes with the medium 106 at the valve 146 and passes out media outlet conduit 154 toward the nozzle 122 located at least partially within the enclosure 130.

Debris and sublimed medium 106 exit the enclosure 130 through the vent 136 and progress along duct 138 to air exhaust handling unit 172.

Referring again to FIG. 6, the method of the present invention for removing labels 114 from the housing 102 includes the step of first supplying a medium 106 in the form of, for example, carbon dioxide, in a compressed liquid form, then transporting the liquid carbon dioxide from the tank 124 to a medium conduit 110. The liquid carbon dioxide is then transformed to at least a partially solid state, for example, in the form of pellets 126. The pellets 126 are adapted to clean the housing 102 when the housing is at least partially made of soft materials, for example, plastic.

Preferably as shown in FIG. 6, the method for removing labels further includes the step of placing the housing 102 within a partially enclosed vented booth or enclosure 130. Preferably the step of adapting the medium or carbon dioxide includes the step of adapting the carbon dioxide to exit the conduit 110 in the form of carbon dioxide pellets having a diameter of less than approximately 40,000 of an inch.

Referring again to FIG. 6, the method according to the present invention for removing labels 114 from the housing 102 includes the step of supplying a medium 106 in, for example, the form of liquid carbon dioxide at a pressure above ambient pressure. The method further includes the step of transporting the carbon dioxide 106 through a conduit 110. The method also includes the step of transforming the medium 110 to at least partially a solid state, for example, in the form of solid carbon dioxide pellets 126. The method further includes the step of adapting the pellets 126 to remove labels 114 from the housing 102.

The method for removing labels of the present invention further include the step of replacing the housing 102 at least partially within a vented booth or enclosure 130. The method for removing labels may further include adapting the medium 106 to exit the conduit 110 at a temperature below the gas transition temperature of adhesive 120 used to secure the label 114 to the housing 102.

By providing an apparatus for cleaning a housing including a medium which gives adapted to clean a housing made of soft materials, a apparatus may be provided which provides for efficient cleaning of soft materials.

By providing an apparatus for cleaning a housing including an enclosure for containing debris and the medium, a clean and compact work area may provide it.

By providing an apparatus for cleaning a housing in which dry carbon dioxide pellets are forced by a compressed air stream upon the housing, a housing may be cleaned with little mess as the carbon dioxide sublimates.

By providing an apparatus for cleaning a housing including an air conduit for transporting compressed air from an air source, the medium may provide sufficient force to sufficiently clean the housing while the low mass of the medium may minimize the damage to the soft housing.

By providing an apparatus in which compressed air is used to propel the carbon dioxide pellets with a pressure of at least 70 PSI, quick efficient cleaning can be performed on soft particles.

By providing an apparatus for cleaning housings which includes a valve having a venturi to create a vacuum to draw the dry carbon dioxide pellets into the conduit, a solid carbon dioxide cleaning system may be provided which does not clog in the conduit.

By providing a solid carbon dioxide pellet cleaning system in which the pellets have a diameter of less than 40,000 of an inch, soft delicate surfaces may be cleaned without damaging the surfaces.

By providing a solid carbon dioxide cleaning system, such that the carbon dioxide particles are sufficiently cold to freeze the adhesive labels may be rapidly and completely removed from a housing.

By providing a cleaning system in which the cleaning material has a temperature below the glass transition temperature of the adhesive, a label may be removed as well as its adhesive quickly and simply.

By providing a cleaning system utilizing a cold medium and by providing a heater to intermittently warm the conduit through which the medium travels, an apparatus may be provided which is durable and in which the conduit or hose does not quickly crack and break.

While this invention has been described in conjunction with various embodiments, it is evident that many alternatives, modifications, and variations will be apparent to those skilled in the art. Accordingly, it is intended to embrace all such alternatives, modifications, and variations as fall within the spirit and broad scope of the appended claims.

We claim:

1. An apparatus for removing labels from a housing, comprising:

a tank for storing a medium at a pressure above ambient pressure;

a medium conduit in communication with said tank for transporting the medium therefrom, said medium conduit defining a opening therein;

a heater functionally associated with said medium conduit; and a controller for controlling operation of said heater wherein the medium exiting said medium conduit is adapted to remove labels from the housing;

wherein at least a portion of the housing comprises a soft material; and wherein the medium exiting the medium conduit is adapted to clean the portion of the housing.

2. The apparatus of claim 1, further comprising at least one of:

an enclosure for containing debris from the cleaning of the housing and for containing the medium; and a nozzle extending from the medium conduit.

3. The apparatus of claim 1, wherein the medium comprises carbon dioxide.

4. The apparatus of claim 1, wherein said conduit is adapted to transform said medium from a liquid to a solid.

5. The apparatus of claim 1, further comprising:

an air conduit for transporting compressed air from a compressed air source; and a device operably associated with said air conduit and with the medium conduit for mixing compressed air with the medium.

6. The apparatus of claim 5, wherein said compressed air source has a pressure of at least about 15 pounds per square inch.

7. The apparatus of claim 5, wherein said device comprises a venturi.

8. The apparatus of claim 1, wherein at least one of said medium conduit and said tank are adapted to provide the medium in the form of pellets.

9. The apparatus of claim 1, wherein at least one of said medium conduit and said tank are adapted to provide the medium in the form of carbon dioxide pellets having a diameter of less than approximate 0.040 inches.

10. The apparatus of claim 1, wherein:

the labels are secured to the housing with an adhesive; and wherein the medium exiting said medium conduit is adapted to freeze the adhesive securing the labels to the housing.

11. The apparatus of claim 10, wherein the medium exiting said medium conduit has a temperature below the glass transition temperature of the adhesive.

12. The apparatus of claim 1 further comprising an air conduit associated with the medium conduit wherein the heater is situated between an inlet air conduit and an outlet air conduit.

13. An apparatus for removing labels from a housing, comprising:

a tank for storing a medium at a pressure above ambient pressure;

a medium conduit in communication with said tank for transporting the medium therefrom, said medium conduit defining a opening therein, the medium exiting said medium conduit at the opening adapted to remove labels from the housing and a heater attached to said conduit for warming said conduit;

wherein the heater operates intermittently.

14. The apparatus of claim 13, wherein the housing comprises a soft material.

15. The apparatus of claim 13 further comprising a controller for controlling operation of said heater.

16. The apparatus of claim 13 further comprising an air conduit associated with the medium conduit wherein the heater is situated between an inlet air conduit and an outlet air conduit.

17. The apparatus of claim 13 wherein the medium includes a carbon dioxide pellet having a diameter of less than about 0.040 inches.

18. An apparatus for cleaning a housing, comprising:

a tank for storing carbon dioxide at a pressure higher than ambient pressure;

a medium conduit in communication with said tank for transporting a medium therefrom, said medium conduit defining a opening therein, the medium exiting the medium conduit at said opening being in at least partially solid form and adapted to remove labels from the housing;

a heater functionally associated with said medium conduit;

at least one enclosure for containing debris from the cleaning of the housing and for containing the medium and a nozzle extending from said medium conduit;

an air conduit for transporting compressed air from a compressed air source; and a venturi operably associated with said air conduit and with the medium conduit for mixing the compressed air with the medium;

wherein the heater operates intermittently.

19. The apparatus of claim 18 wherein the heater is situated between an inlet air conduit and an outlet air conduit.

20. The apparatus of claim 18 further comprising a controller for controlling operation of said heater.

21. The apparatus of claim 18 wherein the medium includes a carbon dioxide pellet having a diameter of less than about 0.040 inches.

22. A method for removing labels from a housing, comprising the steps of:

supplying a medium at a pressure higher than ambient pressure;

transporting the medium through a conduit;

transforming the medium at least partially to a solid; and adapting the medium to remove labels from the housing.

23. The method as in claim 22 further comprising the step of placing the housing within a partially enclosed vented booth.

24. The method as in claim 22 wherein the step of supplying a medium comprises the step of supplying a supply of $CO_2$ in liquid form.

25. The method as in claim 22 wherein the step of adapting the medium comprises of the step of adapting the medium to exit the conduit at a temperature below the glass transition temperature of adhesive used to secure the label to the housing.

26. The method as in claim 22 further comprising heating the conduit.

27. The method as in claim 26 further comprising controlling the heating using a control system.

28. The method as in claim 26 wherein the heating is intermittently.

* * * * *